United States Patent [19]

Kontz

[11] 4,289,046
[45] Sep. 15, 1981

[54] APPARATUS FOR SYNCHRONIZING SPEED AND ANGULAR POSITION OF POWER DRIVEN MACHINES

[75] Inventor: Robert F. Kontz, Toledo, Ohio
[73] Assignee: Owens-Illinois, Inc., Toledo, Ohio
[21] Appl. No.: 68,233
[22] Filed: Aug. 20, 1979
[51] Int. Cl.$^3$ .................... F16H 1/44; F16H 35/06
[52] U.S. Cl. ...................................... 74/711; 74/713; 74/402; 74/395; 192/56 R; 64/29
[58] Field of Search ............... 74/711, 710, 713, 714, 74/395, 400, 401, 402, 403; 64/29, 30 C; 192/56 R

[56] References Cited

U.S. PATENT DOCUMENTS

| | | | |
|---|---|---|---|
| 2,018,842 | 10/1935 | Durham | 74/395 |
| 2,062,136 | 11/1936 | Marresford | 74/395 |
| 2,092,958 | 9/1937 | Cutler | 74/713 |
| 2,119,247 | 5/1938 | Scott | 74/395 |
| 2,540,154 | 2/1951 | Winder | 74/395 |
| 3,185,275 | 5/1965 | Orwin | 64/29 X |
| 3,511,349 | 5/1970 | Herscovici | 64/29 X |
| 3,722,644 | 3/1973 | Steinhagen | 64/29 X |
| 4,142,616 | 3/1979 | Dekoninck | 64/29 X |
| 4,174,621 | 11/1979 | Woltsen | 64/29 |

FOREIGN PATENT DOCUMENTS

| | | | |
|---|---|---|---|
| 2729775 | 1/1979 | Fed. Rep. of Germany | 64/29 |
| 54-1149569 | 3/1979 | Japan | 74/710 |

Primary Examiner—George H. Krizmanich
Attorney, Agent, or Firm—Charles S. Lynch; Myron E. Click; David H. Wilson

[57] ABSTRACT

The invention provides a simple, yet highly accurate device for synchronizing the speeds of two power-driven machines having separate, variable speed power-drives. A pair of shafts are respectively connected to the two machines and mounted in opposed concentric relationship for rotation in opposite directions at rates respectively proportional to the speed of rotation of the two machines. A differential unit is connected between the two shafts, such unit having equal size input and output sun gears respectively connected to the shafts. The planetary output of the differential unit is connected to a speed control element for at least one of the motors respectively driving the machines to vary the speed of such machine to bring it into rotational synchronization with the other machine. In accordance with a modification of the invention, if angular synchronization is also desired, a one-way clutch is provided between one of the shafts and its respective machine which is disengageable by a minimal torque produced by a difference in the rotational speed of the two shafts, and re-engages only in a fixed angular position when the two shafts are again brought into rotational synchronization.

3 Claims, 3 Drawing Figures

APPARATUS FOR SYNCHRONIZING SPEED AND ANGULAR POSITION OF POWER DRIVEN MACHINES

BACKGROUND OF THE INVENTION

There are many industrial applications wherein it is desired to effect a reliable synchronization of two machines that are driven by separate motors or other forms of prime movers. In some cases, in addition to rotational synchronization, the precise angular position of the rotating elements of the two machines requires synchronization.

In my co-pending application Ser. No. 068,232, filed concurrently herewith, there is disclosed a machine for assembling cup shaped bases on bottles. The assembly machine is driven by separate motor but must operate in synchronization with a source of containers, such as a motor driven conveyor transporting containers from a forming machine. In this application, it is necessary that a container be introduced into the continuously rotating assembly machine at a precise angular position of a rotary table of the machine and hence both rotational and angular synchronization of the assembly machine and the container conveyor is required. At the same time, the synchronizing mechanism must not interfere with operations of either one of the synchronized machines when the other is shut down for temporary repairs or clearance of jams.

Many synchronizing mechanisms have heretofore been proposed but have been characterized by the utilization of complex apparatus which is expensive to build and difficult to maintain in operative condition.

SUMMARY OF THE INVENTION

It is, accordingly, an object of this invention to provide a simple inexpensive synchronizing mechanism for separately power-driven machines which will effect the rotational, and if desired, the angular synchronization of the two machines.

Apparatus embodying this invention comprises a pair of shafts disposed in spaced, opposed concentric relationship. The shafts are respectively connected to the two machines which are to be synchronized in such manner that the shafts are rotating at equal speeds but in opposite direction when synchronization is achieved. A differential unit is mounted between the two shaft ends. Such differential unit is provided with a pair of equal sized input and output sun gears respectively connected to the two shaft ends. The planetary output of the differential unit is connected to a rotationally actuated speed controlling device, such as a rheostat, for one of the motors driving one of the machines. Angular synchronization is achieved by interposing a torque responsive clutch between one of the shafts and its respective machine. The clutch is designed so as to disengage upon the occurrence of any significant torque in the differential unit, which corresponds to a departure of the two machines from synchronization. Upon disengagement, the clutching elements of the clutch are re-engageable only in a fixed angular position so that when the two shafts are brought into rotational synchronism, the clutch will not engage until the proper angular relationship of the two machines is achieved.

Further objects and advantages of the invention will be apparent to those skilled in the art from the following detailed description, taken in conjunction with the annexed sheets of drawings on which is shown a preferred embodiment of the invention.

DESCRIPTION OF PREFERRED EMBODIMENT

Figure 1:
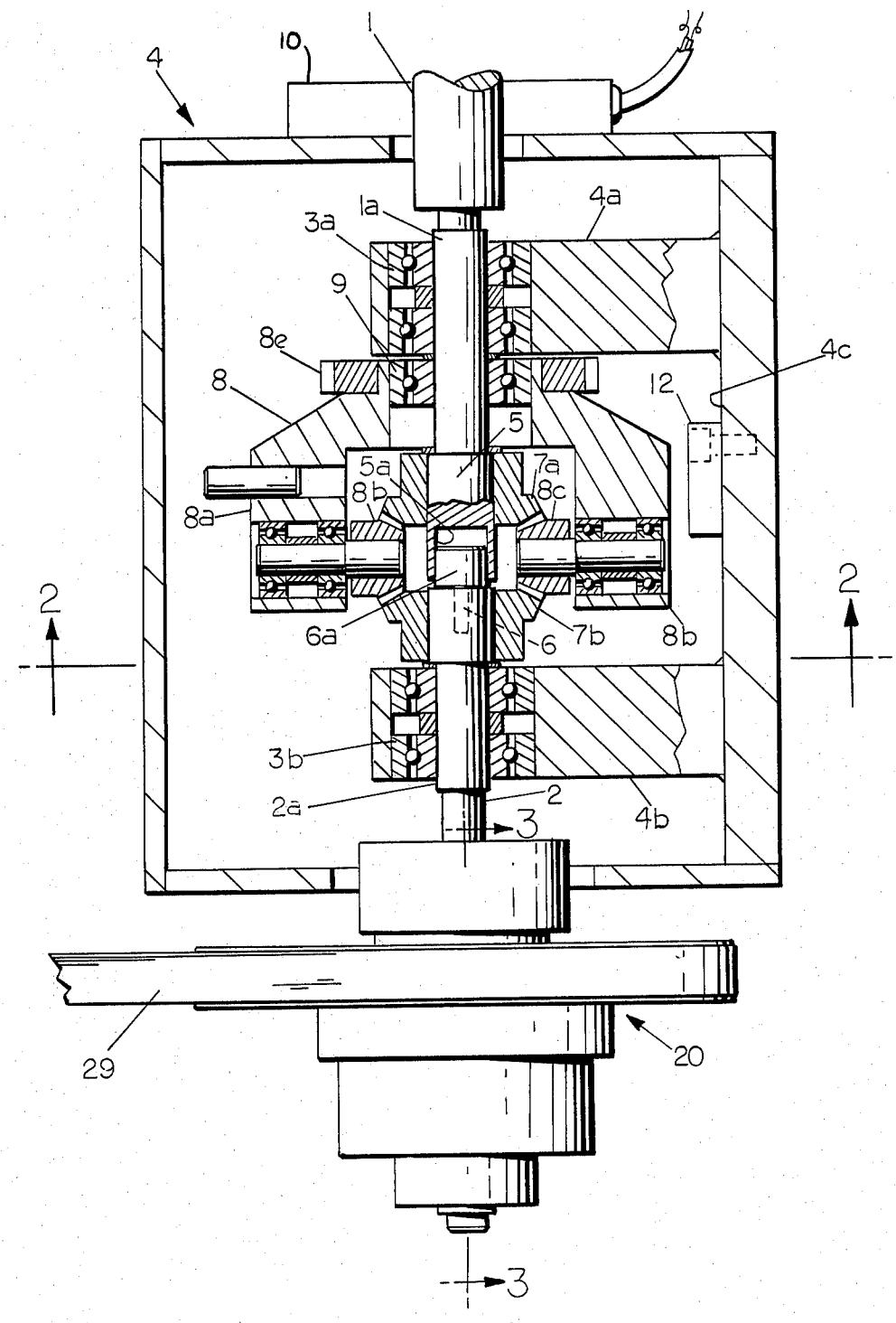
FIG. 1 is a schematic vertical sectional view of a synchronizing mechanism embodying this invention.
Figure 2:
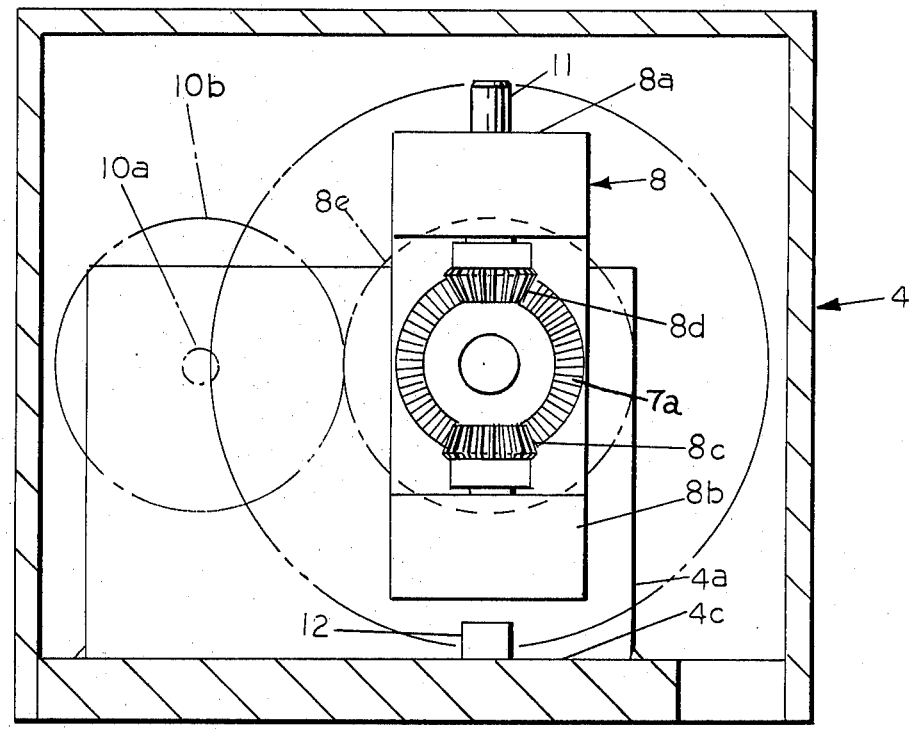
FIG. 2 is a sectional view taken on the plane 2—2 of FIG. 1.
Figure 3:
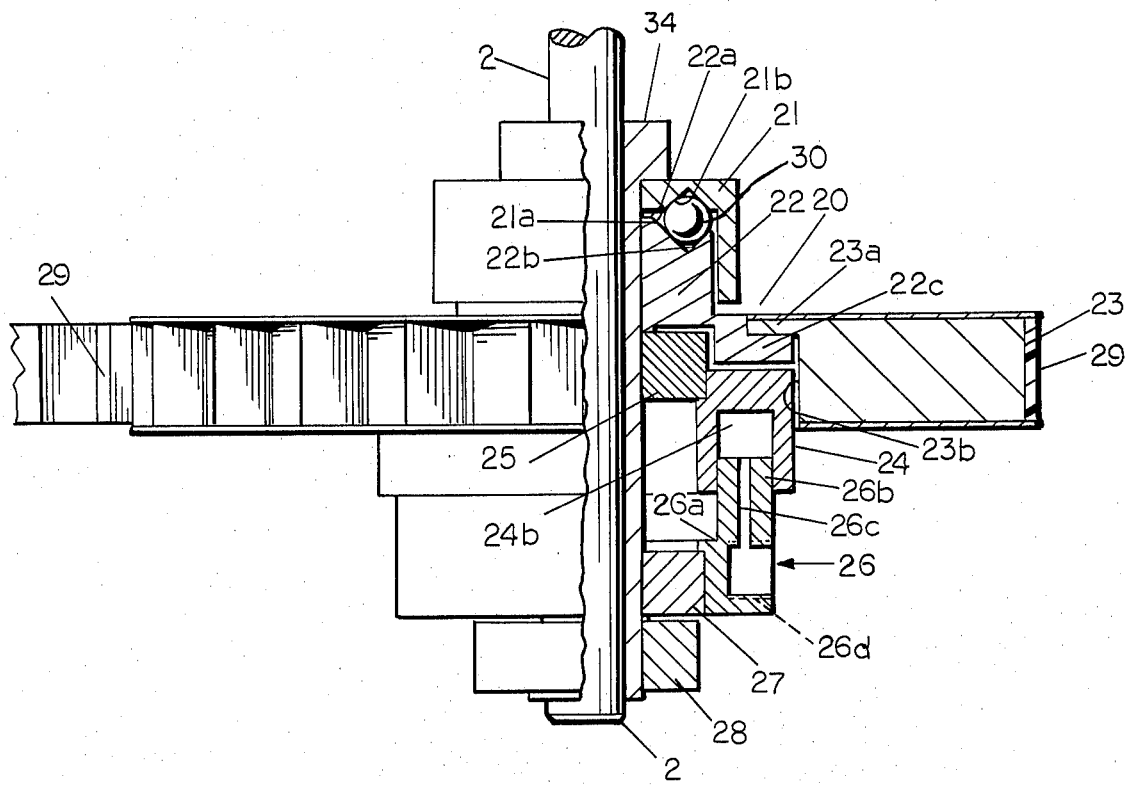
FIG. 3 is a sectional view taken of the plane 3—3 of FIG. 1.

Referring to the drawings, the numeral 1 indicates a shaft which is connected to a power-driven machine (not shown) and the numeral 2 indicates a shaft which is driven by a separate power-driven machine (also not shown), which is required to operate in synchronism with the first mentioned machine. As applied to a container-base assembly machine of the type described in my above mentioned co-pending application, the shaft 2 may be connected to the base assembly machine while the shaft 1 is directly connected to the conveyor which supplies containers to the base assembly machine. Each shaft has a cylindrical bearing portion 1a and 2a which are respectively journalled in antifriction bearing units 3a and 3b which are in turn supported on upstanding pedestals 4a and 4b mounted on a base 4c of a housing 4. Thus the ends of the shafts 1 and 2 are disposed in concentric axially spaced relationship. To insure the concentricity of the two end portions of the shafts 1 and 2, a sleeve 5 may be secured to end of shaft 1 defining a cylindrical chamber 5a which rotationally receives therein a cylindrical head 6a of a bolt 6 secured in the end of shaft 2.

A pair of identical bevel type sun gears 7a and 7b are respectively mounted on the end portions of shafts 1 and 2. A planetary carrier 8 of conventional configuration is journalled by an anti-friction bearing 9 on the adjacent portions of one of the shafts, here shown as a portion 1a of shaft 1. The planetary carrier 8 is of U-shaped configuration and the two arms 8a and 8b thereof respectively journal inwardly projecting planetary bevel gears 8c and 8d which are co-engagable with the bevel teeth of the sun gears 7a and 7b.

The mechanical connections between the shafts 1 and 2 and their respective machines are such that when the machines are operating in synchronism, the two shafts 1 and 2 are rotating at the same speed but in opposite directions. It follows, therefore, that the planetary carrier 8 will be rotated only when the two shafts 1 and 2 depart from rotary synchronization. The resulting rotation of the planetary carrier 8 is converted into a control function operating in a direction to re-establish the synchronization. For example, an annular gear 8e may be secured to the hub portion of the planetary carrier 8 which engages a gear 10b secured to a shaft 10a of a rotational type rheostat 10. Rheostat 10 is conventionally electrically connected in the control circuit for one of the motors driving one of the machines and is actuated by the movement of the planetary carrier 8 in a direction to change the speed of the particular machine to reestablish rotary synchronization between the shafts 1 and 2.

To prevent excessive rotation of rheostat 10, a pin 11 is inserted in one arm 8a of planetary carrier 8 and engages a stop 12 secured to base 4c. When planetary carrier 8 reaches either extreme position of its rotation by engagement of stop 12 with base 4c, the planetary transmission no longer permits the shafts 1 and 2 to rotate independently but causes a momentary torque transfer between the shafts tending to bring the shafts to equal speed and, if no provisions were made for interrupting the driving connection between either one of such shafts 1 and 2 and its respective apparatus, a severe strain would be imposed on the planetary transmission. To eliminate such torque transfer and in the event that angular synchronization of the two machines is also desired, a torque responsive clutch 20 is provided which is connected between the end of one of the shafts 1 or 2 and its respective machine. Clutch 20 is of the type having a pair of annular clutch plate members 21 and 22 defining opposed annular surfaces 21a and 22a.

One clutch plate 21 is secured for co-rotation with the shaft 2 by a mechanism to be hereafter described. The other plate 22 is secured to the inner periphery of an annular pinion 23 which is driven by a timing belt 29 in timed relationship to the rotation of the machine (not shown) which is to be synchronized with a machine driving the shaft 1.

The member 21 is of cup-shaped configuration and the surface 21a forms the bottom of the cup. Cup 21 is rigidly secured to a collar 34 which in turn is rigidly secured to the end of shaft 2. Surface 21a therefore rotates with shaft 2 and is axially fixed relative to the shaft 2.

In contrast, the clutch plate member 22 is rotatable about shaft 2 and is also axially shiftable relative to the shaft 2 so that the surface 22a may vary in axial spacing relative to the opposed surface 21a. Member 22 has a radially extending L-shaped flange 22c engaging and secured to an internally projecting flange 23a of the pinion 23 which is driven by a timing belt 29. An annular cylinder element 24 is provided which is of generally U-shaped cross-sectional configuration and is rigidly mounted within the internal peripheral surface 23b of the pinion 23. Annular cylinder 24 also engages the external periphery of an anti-friction bearing unit 25 which mounts the combined assemblage of elements 22, 23, and 25 for rotation about the shaft 2, but does not interfere with axial movements of the assemblage relative to such shaft.

An annular piston member 26 is provided having an internally projecting portion 26a mounted on a second anti-friction bearing unit 27. Bearing unit 27 is, however, secured against axial displacements relative to the shaft 2 by a retaining collar 28 mounted on shaft 2.

The annular piston 26 has an annular piston portion 26b inserted within the annular cylinder chamber 24b defined by cylinder member 24. Fluid pressure may be supplied to chamber 24b through one or more axially extending passageways 26c formed in the annular piston 27 and a hose fitting aperture 26d connecting with such axial passages. The application of fluid pressure to the cylinder chamber 24b thru a hose (not shown) results in the assemblage of the cylinder 24, pinion 23 and clutch plate element 22 being axially urged toward the clutch plate 21.

A ball 30 is provided between the clutch faces 21a and 22a and those faces are each provided with a depression 21b and 22b of suitable depth to concurrently receive the ball 30 therein and thus effectively lock the two clutch plates 21 and 22 for co-rotation. When depressions 21b and 22b are aligned, the desired angular synchronization between shafts 1 and 2 (FIG. 1) is obtained. The force required to uncouple the clutch plates 21 and 22 is determined by the amount of fluid pressure applied to the cylinder chamber 24b and this pressure is normally only slightly above ambient so that a minimal amount of torque will be transmitted by the clutch. When the operative torque between clutch plate members 21 and 22 exceeds this minimal level, the ball 30 effects an axial camming of the shiftable plate 22 away from plate 21 and thus breaks the connection between the shaft 2 and the sprocket 23.

To restore the shaft 2 into synchronism with the shaft 1, the necessary speed adjustments are effected by the speed control rheostat 10 and, as rotary synchronization is approached, the effective torque on the clutch ball 30 becomes less than that required to axially shift the movable clutch plate 22 against the pressure-bias of cylinder chamber 24b. Hence, the ball 30 will fall in place between the two indentations 21b and 22b, and angular synchronization of the machines to which shafts 1 and 2 are connected will be achieved, concurrently with rotational synchronization.

Modification of this invention will be readily apparent to those skilled in the art, and it is intended that the scope of the invention be determined solely by the appended claims.

What is claimed is:

1. A mechanism for synchronizing two motor driven apparati both in rotational speed and in angular position relative to each other, comprising, in combination:
   (1) a pair of shafts respectively driven in opposite directions by drive trains respectively connected to said apparti, and rotating at equal rotational speeds when rotational speed synchronism of said apparati exists, said shafts being disposed in axially spaced, concentric relationship;
   (2) rotationally adjustable means for the controlling the speed of one apparatus;
   (3) planetary gearing means disposed between said shafts and interconnecting same and having a rotatable output member movable upon the occurence of any rotational speed difference between the said shafts;
   (4) means connecting said rotatable output member to said rotationally adjustable means for adjusting the speed of said one apparatus in a direction to bring the rotational velocity of said one apparatus into rotational synchronism with the other said apparatus;
   (5) means for limiting the rotational movement of said rotatable output member to less than 360°, whereby torque is transmitted from one said shaft to the other whenever said rotatable output member reaches the extreme of its rotation in either direction; and
   (6) a torque responsive clutch incorporated in one of said drive trains, said clutch being disengagable by any significant torque produced on said one drive train by said planetary gearing means, said clutch being re-engagable only in a selected angular relationship between the said one shaft and its respective motor driven apparatus.

2. A mechanism for synchronizing two motor-driven apparati both in rotational speed and in angular position, comprising, in combination:
   (1) a pair of shafts respectively driven by drive trains in opposite directions and at equal speed by said apparati when rotational speed synchronism exists, said shafts being disposed in axially spaced, concentric relationship;
   (2) rotationally adjustable means for controlling the speed of one apparatus;

(3) planetary gearing means disposed between said shafts and having a rotatable output member movable upon the occurence of any speed difference between the said shafts;

(4) means connecting said rotatable output member to said rotationally adjustable means for adjusting the speed of one apparatus in a direction to bring the rotational velocity of such one apparatus into synchronism with the other said apparatus;

(5) means for limiting the rotational movement of said rotatable output member, whereby torque is transmitted from one said shaft to the other thru said planetary gearing means;

(6) an angular synchronizing mechanism disposed in the drive train for one of said shafts, said angular synchronizing mechanism comprising a pair of juxtapositioned disc surfaces respectively rotationally secured to one of said apparatus and the said one shaft;

(7) yieldable means urging said disc surfaces toward abutting relationship;

(8) a ball disposed between said surfaces, and (9) each disc surface having a single conical depression co-operating with a single conical depression in the other surface to secure said ball against relative rotation, thereby locking said disc surfaces for co-rotation in a fixed angular relationship whenever no torque is imposed on said one shaft by said planetary transmission means and releasing said discs for relative rotation whenever torque is imposed on said one shaft by said planetary gearing means.

3. The mechanism of claim 1 wherein said yieldable means comprises co-operating piston and cylinder elements operatively connected to one of said disc surfaces, and means for supplying pressured fluid to the cylinder element to axially bias said one disc surface toward the other disc surface, thereby imposing a constant force holding said ball in said conical depressions.

* * * * *